INVENTORS
GEORGE S. TURNER
ALEXANDER von der LAUNITZ
ROBERT D. LORENZ
BY
ATTORNEY

United States Patent Office 3,283,563
Patented Nov. 8, 1966

3,283,563
GAS CHROMATOGRAPHIC SYSTEM HAVING
BAROMETRIC PRESSURE COMPENSATION
George S. Turner, Fullerton, Robert D. Lorenz, La Habra, and Alexander von der Launitz, Anaheim, Calif., assignors to Beckman Instruments, Inc., a corporation of California
Filed July 17, 1963, Ser. No. 295,645
5 Claims. (Cl. 73—23.1)

The present invention relates to a gas chromatograph system that is vented to atmospheric pressure and more particularly to an arrangement in such a system for compensating for errors inherent in such systems due to changes in barometric pressure. Chromatographic analyzer systems are increasingly employed in monitoring process streams of gaseous mixtures to give data for process control. These systems normally include a chromatograph column having a carrier fluid flowing therethrough into which a slug of gaseous sample from the process stream is injected. The gaseous sample is separated in the column into a number of individual constituents which are then passed through a suitable detector as they emerge at separate intervals from the outlet end of the chromatograph column. It is normal practice to vent the gases leaving the detector to the atmosphere.

The sample is obtained by tapping the process stream with a suitable conduit which directs the sample stream through a sample valve having a sample loop or cavity of predetermined volume. Periodically the sample valve switches in such a manner to place the sample loop or cavity into the carrier stream leading to the chromatograph column.

It is normal practice to exhaust the sample stream flowing through the sample loop or cavity to atmosphere. Therefore, the size or mass of the gaseous sample injected from the sample cavity into the carrier fluid varies with changes in atmospheric pressure. That is, an increase in barometric pressure tends to compress the sample gas thereby to increase the total quantity or mass of the sample injected from the sample loop or cavity. Unless some method of compensating for this variation in sample size or mass is incorporated into the system, the analytical results are affected by this variation.

Fortunately, the gas chromatograph has some "built-in" compensation. The amount of dilution of sample components at the detector is determined by barometric pressure. At higher pressures, dilution increases and this tends to decrease response of a thermal conductivity type detector inasmuch as the thermal conductivity of a mixture is a function of composition. Other parameters of a chromatograph system which are affected by changes in barometric pressure are: change in column efficiency with pressure; and change in detector response with pressure. While these and possible other contributing factors are not completely understood, their net combined effect is to lower response of the system as pressure increases and thus to partially compensate for increase in sample size. However, these "built-in" compensating factors do not completely nullify the entire analytical error due to variation in sample size attributed to changes in barometric pressure.

Accordingly, it is an object of the present invention to provide an improved gas chromatograph system that completely compensates for variations in sample size due to variations in barometric pressure.

Another object of the present invention is to provide an improved gas chromatograph system incorporating an arrangement for substantially compensating for variations in an analytical results of the system due to variations in sample size attributed to changes in barometric pressure.

A more specific object of the present invention is to provide an improved gas chromatograph system in which the variation in sample size attributed to changes in barometric pressure is closely controlled to compensate for the analytical error resulting from changes in other operating parameters of the system also affected by variations in barometric pressure.

Further objects and advantages of the invention will become apparent as the following description proceeds and the features of novelty which characterize the invention will be pointed out with particularity in the claims annexed to and forming a part of this specification.

In carrying out the objects of the present invention, there is provided a gas chromatograph system having an outlet exhausting to atmosphere and including a sample stream also exhausting to atmosphere so that changes in barometric pressure affect the operating parameters of the system. In order to adjust for analytical errors inherently associated with such a chromatograph system due to variations in barometric pressure, a back pressure regulating means referenced to atmospheric pressure is provided in the sample stream vent line for adjusting and maintaining the sample gas stream at a predetermined pressure relative to atmospheric pressure thereby to reflect a change in sample size of proper magnitude to compensate for the change in the chromatograph system response due to variations in barometric pressure.

For a better understanding of the invention, reference may be had to the accompanying drawing in which.

Figure 1:
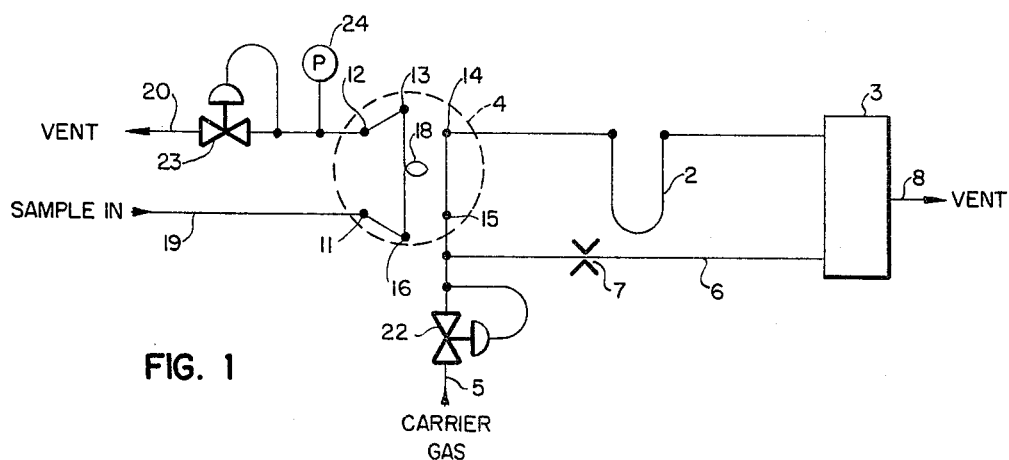
FIG. 1 is a simplified flow diagram of a chromatograph system illustrating the present invention.

Referring now to FIG. 1, there is shown a schematic diagram of the chromatograph system of the present invention including a chromatograph column 2, a detector 3 and a sample injection valve 4 connected by means of a suitable gas conduit in series circuit. Carrier fluid or gas, such as helium or nitrogen, is directed into the series circuit through the conduit 5. The carrier gas flows through the sample valve 4 into the column 2 and thence into one side of the detector 3. It also flows through a reference line 6, which is provided with a suitable flow restriction 7 designed to limit the flow of carrier gas through reference line 6, to the reference side of the detector 3. It is normal practice to vent the chromatograph system to atmosphere by means of a vent, such as that illustrated by the reference numeral 8, connecting with a detector.

Figure 2:
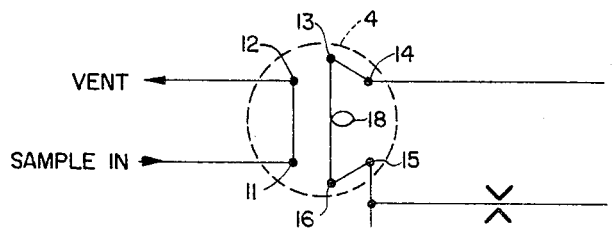
FIG. 2 is a partial view of the flow diagram of FIG. 1 illustrating the sample valve in its sample injecting position.

The sampling valve, for purposes of illustration, is shown as a rotary six-port valve having input and outlet ports 11 and 12 connecting respectively to the sample conduit and the sample vent, inlet and outlet ports 15 and 14 connected into the carrier gas stream and ports 13 and 16 connecting with a loop or cavity 18 of predetermined volume. As may be seen in FIG. 2, when the valve 4 is switched into its injection position, carrier gas is directed through the sample loop 18 to push the sample volume therein into the line leading to the chromatograph column 2. While the valve shown in the illustrated embodiment of the invention contains a separate sample loop 18, it will be understood that the loop 18 may comprise only a small cavity or aperture within the valve member itself which may be indexed across the inlet and outlet ports of the carrier gas flowing through the valve. An example of such a valve is the well-known sliding valve commonly used in the industry for inserting a sample into a chromatograph column. The volume of the sample loop or cavity 18 may be of any desired size according to the analysis to be performed and generally runs from 50 microliters to 50 cubic centimeters in volume.

The sample is directed into the sample valve 4 through the sample inlet line 19 which is tapped at some suitable location (not shown) into the process system. A continuous stream of sample gas usually flows through the valve 4, or through the sample loop or cavity 18 of the valve, and this is, in turn exhausted to atmosphere through the vent line 20. Periodically the sample valve switches and the carrier gas forces the volume of gaseous sample through the outlet 14 into the chromatograph column 2. The column has a different adsorption affinity for the components or different solubility for the components of the sample flowing through the column. The component of the sample with the lowest adsorption coefficient will be eluted from column 2 first and the component with the highest adsorption coefficient for the packing material will be eluted last. This results in an effective separation of the various components of the multi-component sample. The individual components of the sample issue from the column in a binary mixture with the continuously flowing carrier gas.

Detection and quantitative measurement of each of the components of the sample is accomplished in the detector 3. While the present invention is applicable generally to all types of detector apparatus, it is primarily directed to chromatograph systems using thermally responsive detectors. These usually include a thermally sensitive electrical element in one side of the detector through which the reference stream of carrier gas is directed from conduit 6 and a second thermally sensitive element over which the stream of binary mixture is passed. These thermal elements normally form two arms of an electrical bridge circuit whose output signals are a measure of the difference between the thermal properties of the reference and the binary mixture streams and this difference may be interpreted as a percent by volume concentration of the respective components of interest in the binary mixtures flowing through the detector. Variations sensed by the thermal elements of the measuring cell are caused by the variations in thermal properties of the progressive bands of the binary mixtures eluted from the chromatographic column. These create bridge unbalances which are read by any suitable detector means, such as a recording potentiometer.

In order to maintain the pressure drop through the respective sides of the chromatograph system constant with respect to atmospheric pressure, there is provided a pressure regulating means or valve 22 in the upstream portions of the carrier gas line 5. This regulating means or valve 22 is referenced to atmospheric pressure in order to automatically adjust the pressure regulating components therein to maintain a constant pressure drop across the length of the carrier gas lines relative to the atmospheric pressure. For example, if a pressure drop of 15 pounds is to be maintained between the carrier gas stream inlet and the vent 8 of the chromatograph system, the valve means is adjusted to admit carrier gas at a pressure 15 pounds above atmospheric pressure. If atmospheric pressure or barometric pressure varies 2 or 3 pounds one direction or the other, the valve 22 automatically adjusts the pressure of the carrier gas into the respective carrier gas streams to maintain a constant pressure drop of 15 pounds across these lines.

As pointed out previously, an increase in barometric pressure reflects a change in the mass or actual amount of the sample injected into the gas chromatograph column when the sample stream is vented to atmospheric pressure. For example, an increase in barometric pressure of 10 percent reflects a change of approximately 10 percent (depending on the compressibility of the particular sample gas) in the mass of the sample in the cavity or sample loop 18. That is, the sample is more highly compressed and, when injected into the chromatograph system, a greater proportion of the respective components are present in the sample than are present at lower atmospheric pressures. This causes the detector to reflect an increased response over what would normally be the detector response at reduced pressures. Fortunately, as pointed out previously, the increase in sample mass or actual sample quantity injected is partially compensated for by other changes in the chromatograph system which tend to decrease the system response as barometric pressure increases. For example, it is known that the efficiency of a chromatograph column varies with pressure. Furthermore, as outlet pressure at the vent 8 increases, there is a decrease in the response of a thermally sensitive detector which is to some extent pressure sensitive. However, the decrease in response due to pressure responsive changes in the chromatograph system does not compensate for the greatly increased sample size resulting from increased barometric pressure; or conversely, the corresponding increase in response does not compensate for decreases in sample size due to reduced barometric pressure. It has been found that an increase in atmospheric pressure of 10 percent usually results in an overall increase in response of from 2 to 7 percent, depending upon the characteristics of the particular chromatographic system. The major factor associated with this increase is the substantial increase in sample size due to the greater compression of the sample when the sample stream is vented to atmosphere.

In order to make the response of a chromatograph system independent of changes in barometric pressure, the present invention, as shown in FIG. 1, provides a back pressure regulating means 23 in the sample stream vent 20 for controlling the pressure of the gas flowing through the sample cavity. This back pressure regulator 23 is referenced to atmospheric pressure thereby to reflect changes in the absolute pressure of the gas sample stream in accordance with variations in the barometric pressure. While changes in the pressure due to variations in barometric pressure always reflect a change in the sample size in the loop or cavity 18, it will be noted that the percentage change in sample size or volume can be carefully controlled by maintaining a suitable higher pressure in the sample line. Note that, if the sample loop is held at pressure in excess of one atmosphere, but at the same time is subjected to variations in the atmospheric pressure, the effect on the sample size will be lessened. Thus, for example, when the sample loop 18 is maintained at two atmospheres pressure, a barometric pressure change will reflect a change in sample size of approximately one half the amount that would be reflected at one atmosphere. Thus, maintaining a proper pressure level above atmospheric pressure in the sample loop it becomes possible to modify the effect of the barometric pressure variations on the sample size while venting the sample stream to atmosphere.

In FIG. 1 the pressure regulating means 23 is shown as a back pressure regulating means in order to maintain the sample loop 18 at the requisite pressure above atmosphere regardless of variations or fluctuations in pressure that may be present at the sample source. In this preferred embodiment of invention, the pressure regulating valve 23 is made adjustable so that it may be automatically adjusted to provide the proper pressure level desired in order to exactly compensate for the changes experienced in the other portions of the chromatograph system to changes in barometric pressure.

In a given chromatographic system, the extent of the partial compensation required can be readily determined. By elevating the column inlet and the outlet pressure and the sample pressure (thus simulating an increase in barometric pressure), and noting the effect on the chromatogram of the recorder, the factor necessary to reflect the proper change due to increased or decreased sample size may be calculated. Thus, for example, if pressure is increased by 10 percent and peak heights in the chromatogram increase by 5 percent, it is evident that $5/10$ or one half of the variation in sample size is compensated for by other factors. In other words, the sample size has increased the response by 5 percent too much, in this particular example. Thus, for this particular chromatographic system, it is only necessary to increase the pressure of the sample vent so that any change in barometric pressure will increase the sample size by approximately one half of the amount of change that would result if the sample loop were at atmospheric pressure. Therefore, in the example, it would be necessary to raise the pressure of the vent to two atmospheres which would reflect a change in sample size of approximately one half that which would result if the pressure of the sample cavity were to remain at one atmosphere. Therefore, in the example, when the pressure at the vent is two atmospheres and the barometric pressure increases by 10 percent, only one half of this percentage increase is reflected in an increase in sample size, and this compensates for the decrease in response due to the effects of barometric pressure change on other parameters of the system.

Figure 3:
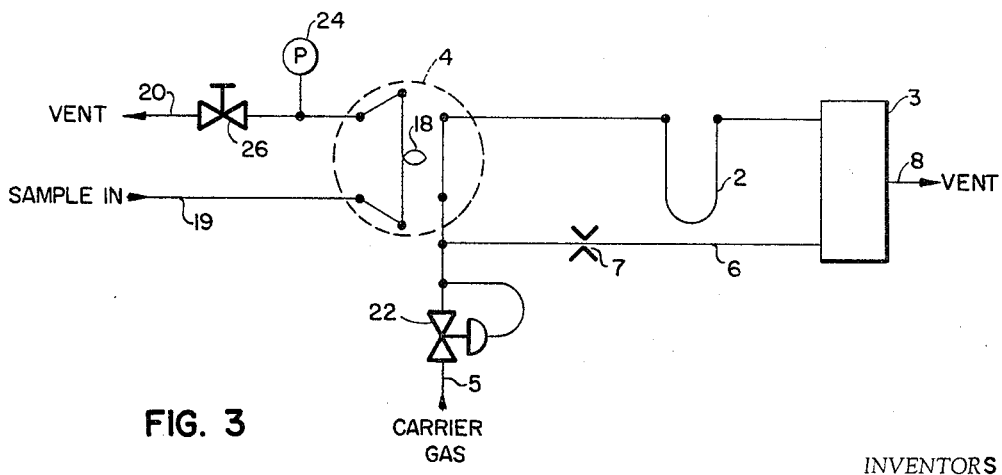
FIG. 3 is a simplified flow diagram of another embodiment of the invention.

Actual practice has indicated that it is possible to fully correct the errors due to changes in barometric pressure by making changes in the pressure of the sample vent line ranging between 1.2 atmospheres and 3.5 atmospheres. In order to permit manual control of the pressure in the sample vent line, a pressure gauge 24 is connected into the line 20. Obviously, this gauge may be formed as a part of the pressure regulator means 23.

Where the stream pressure is constant, it is unnecessary to use a back pressure regulating valve, such as indicated in FIG. 1 by the reference numeral 23. Where the process stream pressure is constant, it is only necessary to use a needle valve to provide a flow restriction in the sample stream thereby to increase the pressure of the sample loop. This arrangement is illustrated in FIG. 3, wherein needle valve 26 may be manipulated to provide proper control of the pressure in the sample stream in accordance with the particular requirements of the chromatograph system. As in the embodiment of FIG. 1, pressure gauge 24 permits the operator to adjust the pressure of the sample line 20 as may be required. It is well known that different chromatograph columns and different detectors may be used with a particular system and these may vary the particular requirements of the system. For example, two separation columns in series may be substituted in a particular system and the decrease in response due to barometric pressure changes may be much greater than that experienced with the original column 2. Thus, it is desirable to be able to automatically or manually vary the pressure in the sample line by means of a variable pressure regulating means, such as illustrated by the valves 23 and 26, to change the pressure in accordance with the requirements of the particular chromatograph components employed.

While in accordance with the patent statutes there has been described what at present is considered to be the preferred embodiments of this invention, it will be obvious to those skilled in the art that various changes and modifications may be made therein without departing from the invention and it is, therefore, the aim of the appended claims to cover all such changes and modifications, as fall within the true spirit and the scope of the invention.

What is claimed is:

1. A gas chromatograph system comprising:

a chromatograph column;

a source of carrier fluid including a delivery conduit connected to said chromatograph column;

a detector connected to receive elutent from said chromatograph column;

pressure regulating means referenced to atmospheric pressure in said delivery conduit for regulating pressure of said carrier fluid flowing through said column and said detector;

a sample injection means having a sample vent to atmosphere for injecting a fluid sample into said delivery conduit to said chromatograph column, said sample injection means including a sample volume normally connected to said vent and means for switching said sample volume into said delivery conduit for sweeping said sample into said column; and a back pressure regulating means in said vent referenced to atmospheric pressure set at a pressure above barometric such that the output of said detector for a given sample component will remain constant regardless of variations in barometric pressure.

2. A gas chromatograph system comprising:

a chromatograph column;

a source of carrier fluid including a delivery conduit connected to said chromatograph column;

a detector connected to receive elutent from said chromatograph column;

pressure regulating means referenced to atmospheric pressure in said delivery conduit for regulating pressure drop of said carrier fluid flowing through said column and said detector;

a sample injection means having a sample vent to atmosphere for injecting a fluid sample into said delivery conduit to said chromatograph column, said sample injection means including a sample volume normally connected to said vent to atmosphere and means for switching said sample volume into said delivery conduit for sweeping said sample into said column; and a back pressure regulating means in said vent referenced to atmospheric pressure, said back pressure regulating means being set to regulate the pressure in said sample volume to a predetermined value relative to atmospheric pressure which will control the relative change in sample size due to variation in barometric pressure to an amount calculated to compensate for changes in response of said chromatograph system due to variations in barometric pressure.

3. A chromatograph system comprising:

at least one chromatograph column;

a source of carrier fluid including a delivery circuit connected to said chromatograph column;

a detector connected to receive the elutent from said chromatograph column;

pressure regulating means referenced to atmospheric pressure in said delivery conduit for regulating the pressure drop of said carrier fluid flowing through said column and said detector;

a sample injection means having a sample vent line to atmosphere for injecting a fluid sample into said delivery conduit to said chromatograph column, said sample injection means including a sample volume normally connected to said vent line and means for switching said sample volume into said delivery conduit for sweeping said sample into said column;

a pressure gauge in said sample vent line; and a manually adjustable needle valve in said sample vent line for adjusting pressure in said sample volume, said regulating valve being referenced to atmospheric pressure and set at a pressure above barometric such that the output of said detector for a given sample component will remain constant regardless of variations in barometric pressure.

4. A gas chromatograph system comprising:

at least one chromatograph column;

a source of carrier fluid including a delivery conduit connected to said chromatograph column;

a thermally responsive detector connected to receive elutent from said chromatograph column through one portion thereof;

a source of reference carrier fluid delivered to said thermally responsive detector to provide a reference gas flow through another portion thereof;

pressure regulating means referenced to atmospheric pressure for regulating the pressure drop of said gas flow respectively through said column and said reference line through said detector;

a sample injection means having a sample vent line to atmosphere for injecting a gaseous sample into said delivery conduit to said chromatograph column, said sample injection valve including a sample cavity normally connected to said vent line and means for switching said sample cavity into alignment with said delivery conduit for sweeping said sample into said chromatograph column;

a pressure gauge in said vent line for indicating the pressure in said sample cavity; and an adjustable back pressure regulating valve in said vent for adjusting and maintaining a predetermined pressure in said sample cavity, said back pressure regulating means being referenced to atmosphere and set to maintain the pressure in said sample volume at a predetermined magnitude above atmospheric pressure such that the output of said detector for a given sample component will remain constant regardless of changes in barometric pressure.

5. A gas chromatograph system comprising:

at least one chromatograph column;

a source of carrier gas including a delivery conduit connected to said chromatograph column;

a detector connected to receive elutent from said chromatograph column;

pressure regulating means referenced to atmospheric pressure in said delivery conduit for regulating pressure of said carrier fluid flowing through said column and said detector;

a sample injection means having a sample vent to atmosphere for injecting a fluid sample into said delivery conduit to said chromatograph column, said sample injection means including a sample volume normally connected to said vent and means for switching said sample volume into said delivery conduit for sweeping said sample into said column; and a back pressure regulating means in said vent referenced to atmospheric pressure, said back pressure regulating means being adjustable to regulate the pressure in said sample volume to a value between 1.2 and 3.5 atmospheres pressure and set to control the relative change in sample size due to variation in barometric pressure to an amount calculated to compensate for changes in response of the chromatograph system due to variations in barometric pressure.

References Cited by the Examiner

UNITED STATES PATENTS

| | | | |
|---|---|---|---|
| 2,964,938 | 12/1960 | Fuller | 73—23.1 |
| 3,041,869 | 7/1962 | Sprachlen et al. | 73—23.1 |
| 3,056,278 | 10/1962 | Guenther | 73—23.1 |
| 3,062,037 | 11/1962 | Donner et al. | 73—23.1 |
| 3,069,894 | 12/1962 | Claudy | 73—23.1 |
| 3,171,274 | 3/1965 | Loyd | 73—23.1 |

RICHARD C. QUEISSER, *Primary Examiner*.